United States Patent
Kodama et al.

(10) Patent No.: US 8,427,777 B2
(45) Date of Patent: Apr. 23, 2013

(54) DISK DRIVE DEVICE PROVIDED WITH LUBRICANT-FILLED FLUID DYNAMIC BEARING

(75) Inventors: Mitsuo Kodama, Shizuoka (JP); Yoshio Kurokawa, Shizuoka (JP)

(73) Assignee: Samsung Electro-Mechanics Japan Advanced Technology Co., Ltd., Shizuoka (JP)

(*) Notice: Subject to any disclaimer, the term of this patent is extended or adjusted under 35 U.S.C. 154(b) by 238 days.

(21) Appl. No.: 12/969,194

(22) Filed: Dec. 15, 2010

(65) Prior Publication Data

US 2011/0181986 A1 Jul. 28, 2011

(30) Foreign Application Priority Data

Jan. 25, 2010 (JP) ................... 2010-013195

(51) Int. Cl.
*G11B 17/02* (2006.01)
*F16C 32/06* (2006.01)

(52) U.S. Cl.
USPC ............... 360/98.07; 360/99.08; 384/100; 384/107; 310/90

(58) Field of Classification Search ............ 360/98.07, 360/99.08; 384/100, 107; 310/90
See application file for complete search history.

(56) References Cited

U.S. PATENT DOCUMENTS

| | | | | |
|---|---|---|---|---|
| 7,830,049 B2* | 11/2010 | Yoneda et al. | ................. | 310/51 |
| 8,013,487 B2* | 9/2011 | Hirata et al. | ................. | 310/90 |
| 8,164,850 B2* | 4/2012 | Gomyo et al. | ............. | 360/98.07 |
| 8,243,383 B2* | 8/2012 | Yamada et al. | ............. | 360/98.07 |
| 2008/0043368 A1* | 2/2008 | Hashimoto | ................ | 360/98.07 |

FOREIGN PATENT DOCUMENTS

JP 2008-275047 11/2008

* cited by examiner

*Primary Examiner* — Jefferson Evans
(74) *Attorney, Agent, or Firm* — Fulwider Patton LLP

(57) ABSTRACT

In a disk drive device, a hub has an outer circumferential wall portion configured to hold a recording disk. A base member has a cylindrical portion, whose central axis is the rotation axis of the hub, on a surface on the side of the hub. A fluid dynamic bearing holds a lubricant and rotatably supports the hub relative to the base member. A ring-shaped attraction plate including a magnetic material is fixed to the base member and faces a magnet in the axial direction. The outer circumferential wall portion is configured such that the outer circumferential wall portion surrounds the attraction plate and that the range of the outer circumferential wall portion in the axial direction overlaps with the range of the attraction plate in the axial direction.

20 Claims, 3 Drawing Sheets

DISK DRIVE DEVICE PROVIDED WITH LUBRICANT-FILLED FLUID DYNAMIC BEARING

CROSS-REFERENCE TO RELATED APPLICATION

This application is based upon and claims the benefit of priority from the prior Japanese Patent Application No. 2010-013195, filed on Jan. 25, 2010, the entire content of which is incorporated herein by reference.

BACKGROUND OF THE INVENTION

1. Field of the Invention

The present invention relates to disk drive devices and particularly to disk drive devices that reduce evaporation of lubricant in fluid dynamic bearings.

2. Description of the Related Art

There are disk drive devices, such as Hard Disk Drives, in which fluid dynamic bearing units are mounted that allow for stable high-speed rotation. For example, lubricant filling between a sleeve forming part of a stator and a shaft forming a part of a rotor in a motor provided with the dynamic pressure bearing described in patent document 1. A dynamic pressure produced in the lubricant supports the rotor in a non-contact state, thereby smooth and high-speed rotation is realized.

[Patent document 1] Japanese Laid-Open Publication No. 2008-275047

A disk drive device, on which a fluid dynamic bearing is mounted, that can be used for a longer term is required. There is a problem where the lubricant filling the fluid dynamic bearing is depleted when the disk drive device is used for a long term. When the lubricant is depleted and results in a shortage, the fluid dynamic bearing cannot generate a sufficient dynamic pressure, and the accuracy of the rotation may be decreased. In the worst case, a malfunction, such as burn-in, of the fluid dynamic bearing may be caused. A major factor for such a depletion of the lubricant is a phenomenon where the amount of lubricant is reduced due to evaporation.

With regard to the evaporation of the lubricant filling in the fluid dynamic bearing, when the vapor-liquid interface of the lubricant is in contact with the outside air, the evaporated lubricant gradually dissipates into the outside air, causing a problem where the lubricant becomes short when the cumulative amount of the evaporation exceeds a pre-set acceptable amount. Therefore, by increasing the time required for the cumulative amount of the evaporation to exceed the pre-set acceptable amount (hereinafter, referred to as "evaporation threshold time"), the lifetime of the disk drive device can be increased. However, increasing the volume of the lubricant so as to increase the evaporation threshold time can result in an increase in the size of the disk drive device.

SUMMARY OF THE INVENTION

In this background, a purpose of the present invention is to provide a disk drive device capable of increasing the lifetime while preventing an increase in the size, by increasing the evaporation threshold time of a lubricant by slowing down the speed of the evaporation of the lubricant filling a fluid dynamic bearing.

A disk drive device according to one embodiment of the present invention comprises: a hub having an outer circumferential wall portion configured to hold a recording disk; a base member having a cylindrical portion, whose central axis is the rotation axis of the hub, on a surface on the side of the hub; a fluid dynamic bearing configured to hold a lubricant and rotatably support the hub relative to the base member; a stator core having a ring portion fixed on the outer circumferential surface of the cylindrical portion and a plurality of salient poles extending in the radial direction from the ring portion; a coil wound around the plurality of salient poles; a magnet fixed to the inner circumferential surface of the outer circumferential wall portion, the magnet being arranged to radially face the plurality of salient poles and provided along the circumferential direction with a plurality of magnetized poles for driving; and a ring-shaped attraction plate fixed to the base member, the attraction plate being arranged to face the magnet in the axial direction, and including a magnetic material. In the disk drive device, a first narrow gap portion is formed between the attraction plate and the magnet, a second narrow gap portion is formed between the base member and the end surface of the outer circumferential wall portion on the side of the base member, and the outer circumferential wall portion is configured to surround the attraction plate such that the range of the outer circumferential wall portion in the axial direction overlaps with the range of the attraction plate in the axial direction.

According to the embodiment, the outer circumferential wall portion surrounds the attraction plate and overlaps with the attraction plate in the axial direction so that an air passage becomes narrower that connects the area, which is formed between the base member and the hub, and the external air, increasing the resistance of an air circulation. Thus, the speed of the evaporation of the lubricant kept between the base member and the hub can be restrained so as to increase the evaporation threshold time of the lubricant. This allows for a disk drive device having a longer operating life to be achieved, contributing to resource protection.

A disk drive device according to another embodiment of the present invention comprises: a hub having an outer circumferential wall portion configured to hold a recording disk; a base member having a cylindrical portion, whose central axis is the rotation axis of the hub, on a surface on the side of the hub; a fluid dynamic bearing configured to hold a lubricant and rotatably support the hub relative to the base member; a stator core having a ring portion fixed on the outer circumferential surface of the cylindrical portion and a plurality of salient poles extending in the radial direction from the ring portion; a coil wound around the plurality of salient poles; and a magnet fixed to the inner circumferential surface of the outer circumferential wall portion, the magnet being arranged to radially face the plurality of salient poles and provided along the circumferential direction with a plurality of magnetized poles for driving. In the disk drive device, the fluid dynamic bearing has a boundary surface between a lubricant and air in an area formed between the base member and the hub, an opening of the cylindrical portion is provided on the outside of the boundary surface in the radial direction, the hub has a cylindrical hanging portion that faces the opening in the radial direction and forms a narrow gap portion with the opening, the dimension of the narrow gap portion in the radial direction is at most 0.2 mm and the dimension of the narrow gap portion in the axial direction is at least five times the dimension of the narrow gap portion in the radial direction.

As described above, forming the third narrow gap portion can prevent the lubricant from evaporating.

Optional combinations of the aforementioned constituting elements, and implementations of the invention in the form of methods, apparatuses, and systems, may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
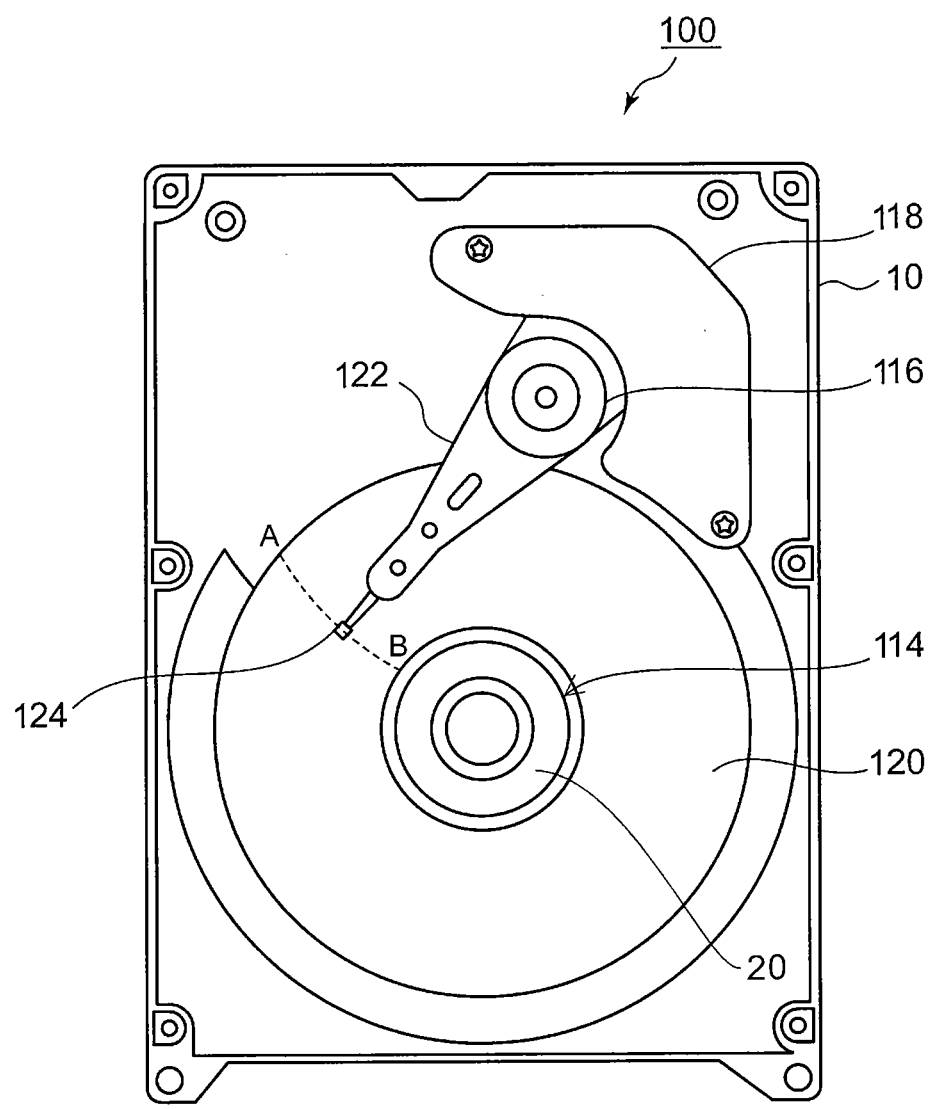
FIG. 1 is a top view showing the internal configuration of a hard disk drive, which is one of the examples of a disk drive device according to the embodiment.

The invention will now be described by reference to the preferred embodiments. This does not intend to limit the scope of the present invention, but to exemplify the invention.

The invention will now be described in reference to the preferred embodiments (hereinafter, referred to as embodiments). The same or equivalent constituting elements and members illustrated in each drawing shall be denoted by the same reference numerals, and the duplicative explanations will be omitted appropriately. The dimensions of members illustrated in each drawing are appropriately enlarged or reduced for easier understanding. Some of members not important for describing the embodiments are omitted from each drawing.

FIG. 1 is a top view showing the internal configuration of a disk drive device 100 according to the embodiment. FIG. 1 shows the disk drive device 100 without a cover so that the internal configuration is exposed. The disk drive device 100 according to the embodiment, for example, functions as a hard disk drive.

A brushless motor 114, an arm bearing unit 116, a voice coil motor 118, etc., are mounted on the upper surface of a base member 10. The brushless motor 114 supports, on a rotation shaft, a hub 20 for mounting a recording disk 120. For example, the brushless motor 114 rotationally drives the recording disk 120 on which data can be recorded magnetically. The brushless motor 114 may be replaced by, for example, a spindle motor. The brushless motor 114 is driven by drive currents of three phases U-phase, V-phase, and W-phase.

The arm bearing unit 116 supports a swing arm 122 in such a manner that the swing arm 122 swings freely in a range of movement AB. The voice coil motor 118 swings the swing arm 122 in accordance with external control data. At the tip of the swing arm 122, a magnetic head 124 is provided. When the disk drive device 100 is being driven, the magnetic head 124 moves over the surface of the recording disk 120 with a slight gap in between along with the swing of the swing arm 122 in the range of movement AB so as to read and write data. In FIG. 1, a point A corresponds to the outermost circumferential position of the recording track of the recording disk 120, and a point B corresponds to the innermost circumferential position of the recording track of the recording disk 120. The swing arm 122 may be moved to the waiting position, which is provided on the outside of the outermost circumference of the recording disk 120 in the radial direction, when the disk drive device 100 is in a stopped state.

The disk drive device 100 according to the embodiment may include all the structures having functions of reading and writing data of the recording disk 120, the swing arm 122, the magnetic head 124, and the voice coil motor 118. Meanwhile, the disk drive device 100 may be only a part for driving the recording disk 120 into rotation.

Figure 2:
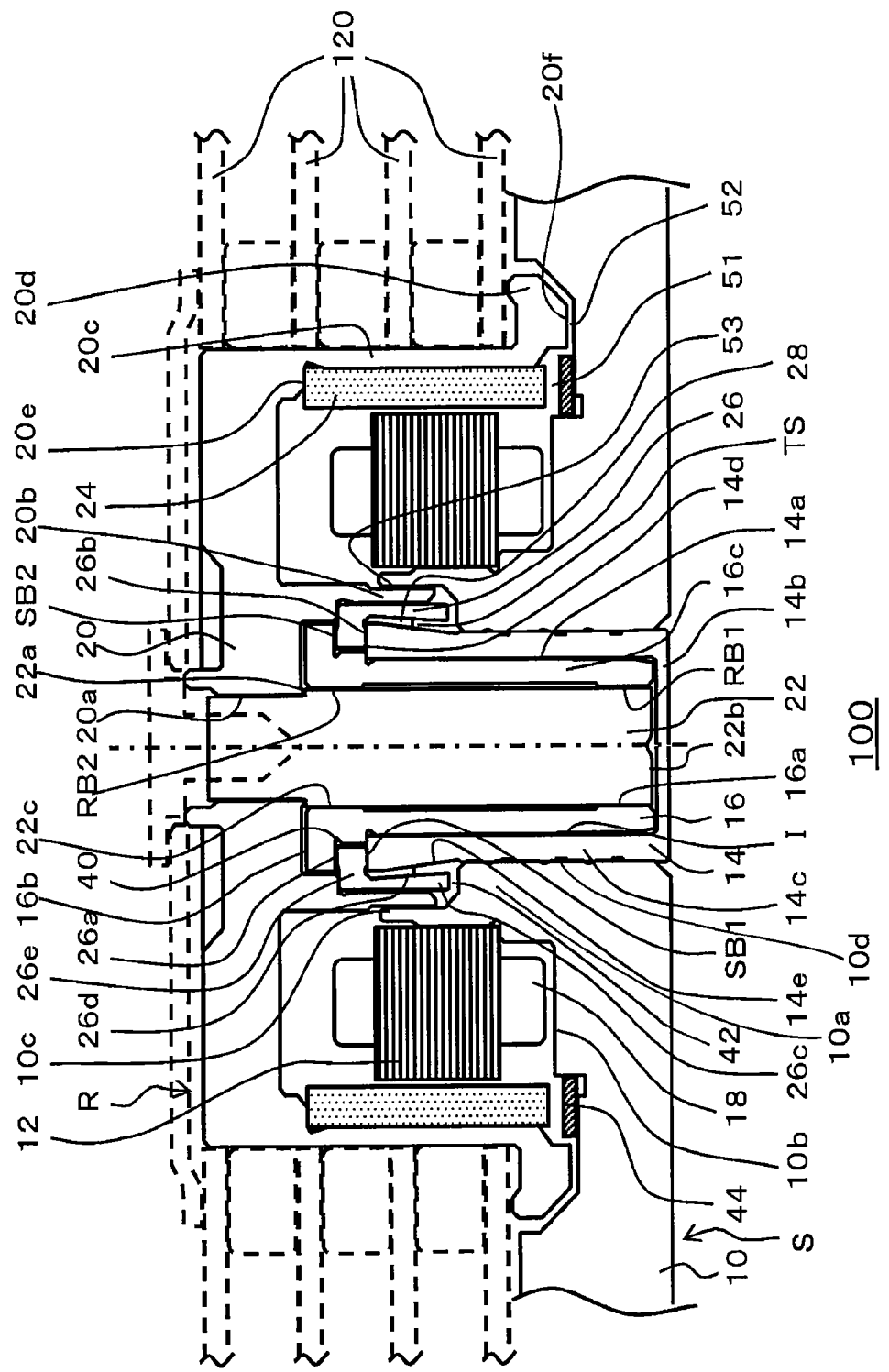
FIG. 2 is a schematic cross-sectional view of a brushless motor in the disk drive device according to the embodiment.

FIG. 2 is a sectional view of the disk drive device 100 according to the embodiment. In the figure, the configuration of the fluid dynamic bearing and the surrounding configuration are mainly shown, and some parts of the configuration are omitted. The disk drive device 100 includes a fixed body S and a rotating body R.

The fixed body S includes a base member 10, a stator core 12, a housing 14, a sleeve 16, a coil 18, and an attraction plate 44. The rotating body R includes a hub 20, a shaft 22, a magnet 24, and a thrust member 26. The fluid dynamic bearing includes the surfaces of the members that hold a lubricant and rotatably supports the hub 20 relative to the base member 10.

The base member 10 includes a cylindrical portion 10a and a base extension portion 10b. The housing 14 includes a groove 14a, a bottom portion 14b, a cylindrical portion 14c, an open end portion 14d, and an outer circumferential surface 14e.

The sleeve 16 includes an inner circumferential surface 16a, a circular projecting portion 16b, and a cylindrical portion 16c. The hub 20 includes a central hole 20a, a cylindrical hanging portion 20b, an outer circumferential wall portion 20c, and a pedestal portion 20e. The shaft 22 includes a step portion 22a, a tip portion 22b, and an outer circumferential surface 22c. The thrust member 26 includes a thrust upper surface 26a, a thrust lower surface 26b, a thrust hanging portion 26c, an inner circumferential surface 26d, and a flange portion 26e.

The cylindrical portion 10a of the base member 10 is formed in a cylindrical shape protruding upward and is provided in such a manner that the cylindrical portion 10a surrounds the central hole into which the fluid dynamic bearing is inserted. The cylindrical portion 10a, whose central axis is the rotation axis of the hub 20, is provided on the surface of the base member 10 on the side of the hub 20. The cylindrical portion 10a is provided with a securing portion 10d to which the housing 14 is fixed and an opening 10c, provided in the upper part thereof, that surrounds a capillary seal portion TS. The opening 10c of the cylindrical portion 10a is formed to have an inner diameter that is larger than that of the securing portion 10d. The opening 10c in the upper part of the cylindrical portion 10a is provided on the outside of the capillary seal portion TS in the radial direction. The base member 10 holds the housing 14 inserted in the central hole, and the cylindrical portion 10a surrounds the housing 14. The stator core 12 is fixed to the outer circumference of the cylindrical portion 10a. The base member 10 is formed by cutting of an aluminum die cast material or by press working of an aluminum sheet or a nickel-plated steel sheet.

A second annular area 42 is formed between the outer circumferential surface of the housing 14 and the inner circumferential surface of the opening 10c of the cylindrical portion 10a. The second annular area 42 is a space having a shape that surrounds the central hole of the base member 10.

The stator core 12 is formed by performing insulation coating such as electro-deposition coating and powder coating on the surface thereof after magnetic plates such as ferrosilicon plates are laminated. The stator core 12 has a ring portion, which is fixed to the outer circumferential surface of the cylindrical portion 10a, and a plurality of salient poles, which extend toward the outside in the radial direction from the ring portion, and a coil 18 is wound around the salient poles. For example, when the disk drive device 100 is three-phase driven, the number of the salient poles is nine. The end portion of a wiring that forms the coil 18 is soldered on a flexible printed circuit arranged on the bottom surface of the base member 10.

A magnet 24 is fixed to the inner circumference surface of the outer circumferential wall portion 20c of the hub 20 and faces the salient poles of the stator core 12. The magnet 24 is formed of an Nd—Fe—B (Neodymium-Ferrum-Boron) material, the surface thereof being treated with electro-deposition coating and splay coating, and the inner circumference surface thereof being magnetized for driving in twelve poles in the circumferential direction.

When a three-phase approximate sinusoidal current flows through the coil 18 via the flexible printed circuit by a drive circuit, the coil 18 generates a rotating magnetic field at the salient poles of the stator core 12. The driving magnetic pole of the magnet 24 generates a rotational driving force by the mutual interaction with the rotating magnetic field and rotates a rotating body R. The stator core 12, the coil 18, and the magnet 24 are driving force generators that rotationally drive the rotating body R. The height to the lower end surface of the coil 18 in the axial direction is substantially identical with that to the lower end surface of the magnet 24 in the axial direction. The lower end surface of the coil 18 has concavities and convexities due to the winding. The height to the lower end surface of the coil 18 in the axial direction may be the average value of the concavities and convexities.

The attraction plate 44 is fixed to the upper surface of the base member 10 that faces the lower end surface, in the axial direction, of the magnet 24. A first narrow gap portion 51 is formed as a space between the attraction plate 44 and the magnet 24, which face each other in an axial direction. The attraction plate 44 is a ring member and is formed by pressing a cold-rolled steel plate or silicon steel plate, which include a soft magnetic material. The attraction plate 44 is, for example, treated with nickel plating on the surface thereof for an anti-corrosion purpose.

The attraction plate 44 and the magnet 24 generate a magnetic attraction force in an axial direction between each other. In other words, the attraction plate 44 generates an attraction force (hereinafter, referred to as an "attraction force of the attraction plate 44") that draws the rotating body R including the magnet 24 and the hub 20 toward the base member 10. During the rotation of the rotating body R, a levitation force generated by the fluid dynamic bearing, the attraction force of the attraction plate 44, and the gravity applied to the rotating body R are in balance so that the rotating body R rotates in a non-contact manner with the surrounding members.

The housing 14 is formed in an approximate cup shape and is fixed to the inner circumferential surface of the cylindrical portion 10a of the base member 10 by adhesion or press-fitting. The housing 14 is provided with the cylindrical portion 14c surrounding the sleeve 16, the open end portion 14d that is provided at the upper end thereof on the side towards the hub 20 and has an end surface in the axial direction, and the bottom portion 14b that seals the end portion of the cylindrical portion 14c on the opposite side of the open end portion 14d.

The housing 14 is arranged so that the lower end of the sleeve 16 is closed up and that a circular projecting portion 16b of the sleeve 16 is protruded from the open end portion 14d. The bottom portion 14b and the cylindrical portion 14c may be integrally formed or may be formed of separate members and fixed together. The housing 14 is formed of a copper alloy, a sintered alloy by powder metallurgy, a stainless steel, or a resin material such as polyetherimide, polyimide, and polyamide. When the housing 14 is formed of the resin material, the resin material is preferably configured to include a carbon fiber such that the specific resistance of the housing 14 is $10^6$ ($\Omega\cdot$m) or less. This can secure the static electricity removal performance of the disk drive device 100.

A groove 14a extending in the axial direction is formed on the inner circumferential surface of the housing 14. The cross-sectional shape of the groove 14a is recessed arc-shape or rectangular. The groove 14a becomes a communication passage I by connecting both upper and lower ends of the housing 14 and by being filled with the lubricant 28, while fitting the sleeve 16 into the cylindrical portion 14c of the housing 14. Providing the communication passage I allows for the lubricant 28 to be circulated, thus allowing for further evening out of the dynamic pressure generated at a dynamic pressure generating site. Further, when the balance among the dynamic pressures at dynamic pressure generating sites is not maintained due to a disturbance where a force from outside is exerted on the shaft 22 and the rotating body R, the dynamic pressures can be instantly averaged by the communication passage I so as to maintain the pressure balance. As a result, a floating amount of the rotating body R is stabilized relative to the fixed body S, allowing for the disk drive device 100 with high-reliability to be acquired.

The sleeve 16 is formed in a cylindrical shape and is fixed to the inner circumferential surface of the housing 14 by adhesion or press-fitting such that the sleeve 16 is fixed coaxially with the central hole of the base member 10. The sleeve 16 is provided with a cylindrical portion 16c in which the shaft 22 is interpolated and with a circular projecting portion 16b extending outwardly in the radial direction from the upper end portion of the cylindrical portion 16c on the side of the hub 20. The inner circumferential surface 16a of the sleeve 16 surrounds the shaft 22.

A radial space portion is formed between the inner circumferential surface 16a of the sleeve 16 and the outer circumferential surface 22c of the shaft 22, and a first radial dynamic pressure generating site RB1 and a second radial dynamic pressure generating site RB2, which generate a radial dynamic pressure, are arranged in the radial space portion. If the first radial dynamic pressure generating site RB1 and the second radial dynamic pressure generating site RB2 are not to be specifically separated, the first radial dynamic pressure generating site RB1 and the second radial dynamic pressure generating site RB2 are merely referred to as a radial dynamic pressure generating site. The circular projecting portion 16b and the cylindrical portion 16c may be formed integrally or may be formed of separate members and fixed together. A first area 40 is formed as an annular space between the lower end surface of the circular projecting portion 16b and the open end portion 14d.

The sleeve 16 is formed of a copper alloy, a sintered alloy by powder metallurgy, a stainless steel, etc. The sleeve 16 may be also formed of a resin material such as polyetherimide, polyimide, and polyamide. When the sleeve 16 is formed of the resin material, the resin material is preferably configured to include a carbon fiber, etc., such that the specific resistance of the sleeve 16 is $10^6$ ($\Omega\cdot$m) or less. This can secure the static electricity removal performance of the disk drive device 100.

The hub 20 is formed in an approximate cup shape and is provided with the central hole 20a provided in the central portion thereof, the cylindrical hanging portion 20b provided such that it protrudes downwardly from the position where it surrounds the central hole 20a, and the outer circumferential wall portion 20c, provided on the outside of the cylindrical hanging portion 20b, with which the central hole of the recording disk 120 is engaged. The outer circumferential wall portion 20c is provided with an outward extension portion 20d extending outwardly in the radial direction in the lower part of the outer circumferential wall portion 20c. The recording disk 120 is mounted on the outward extension portion 20d. The outer circumferential wall portion 20c is configured to hold the recording disk 120.

At the lower end surface of the outer circumferential wall portion 20c, an end surface 20f is provided that forms a second narrow gap portion 52 facing the base member 10 in the axial direction. The second narrow gap portion 52 is formed between the base member 10 and the end surface of the outer circumferential wall portion 20c on the side of the base member 10. The second narrow gap portion 52 is a void having certain dimensions. The hub 20 has a soft magnetic property and is, for example, made of steel materials such as SUS430F. The hub 20 is formed into substantially cup-shaped form by, for example, press working or cutting of a steel plate. For example, the stainless steel having a product name of DHS1, which is provided by Daido Steel Co., Ltd., produces small amount of out gas and is easy to be processed. For these reasons, the stainless steel is preferable as a material used for the hub 20. Similarly, the stainless steel having a product name of DHS2 is even more preferable as a material used for the hub 20 in that it has good corrosion resistance. The hub 20 is rotated integrally with the shaft 22 to drive the recording disk 120.

The shaft 22 is press-fitted into and fixed to the central hole 20a of the hub 20 so that the shaft 22 is integrated with the hub 20 at a pre-set right angle. The shaft 22 has a circular step portion 22a in the middle of the outer circumferential surface. The step portion 22a can control the movement of the shaft 22 in the axial direction when the shaft 22 is press-fitted into the central hole 20a of the hub 20. The step portion 22a thus functions for positioning. The shaft 22 is interpolated in the sleeve 16, and the tip portion 22b of the shaft 22 is housed in the cylindrical portion 16c. The shaft 22 can be formed of a stainless material.

The thrust member 26 has an inverted L-shaped cross section in which the alphabetical capital letter "L" is inverted upside down. The thrust member 26 has a flange portion 26e surrounding the outer circumference of the sleeve 16 and a thrust hanging portion 26c surrounding the outer circumference of the housing 14. The flange portion 26e has a shape having a thrust upper surface 26a and a thrust lower surface 26b, the shape being thin in the axial direction. The thrust hanging portion 26c has a shape extending in the axial direction. The flange portion 26e is arranged so as to face the outer circumference of the cylindrical portion 16c via a gap and to face the lower surface of the circular projecting portion 16b and the end surface of the open end portion 14d in the axial direction via gaps.

The thrust hanging portion 26c is joined to the outer edge portion of the flange portion 26e and is fixed to the inner circumferential surface of the cylindrical hanging portion 20b with an adhesive. That is, the outer circumferential surface of the thrust hanging portion 26c is fixed to the inner circumferential surface of the cylindrical hanging portion 20b with an adhesive. The thrust member 26 is rotated integrally with the hub 20, and at the time, the flange portion 26e is rotated through the first area 40, and the thrust hanging portion 26c is rotated through the second area 42.

The thrust lower surface 26b of the flange portion 26e and the open end portion 14d of the housing 14 form a first thrust dynamic pressure generating site SB1, and the thrust upper surface 26a of the flange portion 26e and the lower surface of the circular projecting portion 16b form a second thrust dynamic pressure generating site SB2. If the first thrust dynamic pressure generating site SB1 and the second thrust dynamic pressure generating site SB2 are not to be specifically distinguished, the first thrust dynamic pressure generating site SB1 and the second thrust dynamic pressure generating site SB2 are merely referred to as a thrust dynamic pressure generating site.

The inner circumferential surface 26d of the thrust hanging portion 26c has a tapered shape, the radius of which becomes gradually smaller toward the side opposite to the side on which the flange portion 26e is formed, and forms a capillary seal portion TS. The thrust member 26 can be, for example, formed easily and inexpensively by press working of a plate-like metallic material. Further, even when the thrust member 26 becomes small in size and thin, the thrust member 26 can still be manufactured so as to have good dimension accuracy by press working. As a result, press working can contribute to the miniaturization and light weight of the disk drive device 100.

The thrust member 26 has a function of preventing the rotating body R from coming off the fixed body S. When the rotating body R and the fixed body S relatively move by an impact on the disk drive device 100, the flange portion 26e comes into contact with the lower surface of the circular projecting portion 16b. The thrust member 26 receives a stress from being in contact with the lower surface of the circular projecting portion 16b, and the stress is applied in the direction in which the thrust member 26 is detached from the cylindrical hanging portion 20b. If the joint distance between the thrust hanging portion 26c and the cylindrical hanging portion 20b is small, the joint strength becomes weak, increasing the possibility where the thrust hanging portion 26c and the cylindrical hanging portion 20b are detached from each other by even a small impact at this time. In other words, as the joint distance between the thrust hanging portion 26c and the cylindrical hanging portion 20b becomes longer, the tolerance against an impact becomes stronger.

On the other hand, when the length of the cylindrical portion 16c is set to be shorter and when the flange portion 26e is set to be thicker, the capillary seal portion TS becomes shorter, causing the capacity of the lubricant 28 that can be held in the capillary seal portion TS to be small. Therefore, there is a possibility where the lubricant 28 may be in shortage even after a small amount of the lubricant 28 is scattered by an impact. Such shortage of the lubricant causes the function of the fluid dynamic bearing to be deteriorated, likely causing a malfunction such as burn-in.

The capillary seal portion TS in the disk drive device 100 is designed to be long in the up-down direction by thinning the flange portion 26e. The disk drive device 100 is configured such that the amount of the lubricant 28 that can be held becomes large and that the lubricant 28 is hardly in shortage even when some amount of the lubricant 28 is scattered by the impact. In other words, the distance of the thrust member 26 in the axial direction is designed to be large relative to the thrust hanging portion 26c and small relative to the flange portion 26e. This increases the volume of the lubricant 28, and the tolerance of the lubricant 28 against evaporation is thus improved.

The fluid dynamic bearing that acts in the radial direction includes a radial dynamic pressure generating site, and the radial dynamic pressure generating site includes the outer circumferential surface 22c of the shaft 22, the inner circumferential surface 16a of the sleeve 16, and the liquid lubricant 28 filling in the space between these two surfaces. The radial dynamic pressure generating site supports the rotating body R by generating a dynamic pressure in the radial direction. The radial dynamic pressure generating site has a radial dynamic pressure groove (not shown), on at least one of the outer circumferential surface 22c and the inner circumferential surface 16a, which face against each other, for generating a dynamic pressure. The dynamic pressure groove is formed into a herringbone-like shape.

On the other hand, the fluid dynamic bearing that acts on the thrust direction includes a thrust dynamic pressure generating site. The first thrust dynamic pressure generating site SB1 includes the thrust lower surface 26b of the flange portion 26e, the open end portion 14d, and the lubricant 28 filling the space formed by these surfaces. The second thrust dynamic pressure generating site SB2 includes the thrust upper surface 26a of the flange portion 26e, the lower surface of the circular projecting portion 16b, and the lubricant 28 filling the space formed by these surfaces.

The thrust dynamic pressure generating site has a thrust dynamic pressure groove (not shown), on at least one of the surfaces that form the thrust dynamic pressure generating site, for generating a dynamic pressure. The thrust dynamic pressure groove can be formed into a spiral-like or herringbone-like shape. With the rotation of the rotating body R, the thrust dynamic pressure generating site generates a dynamic pressure in a pump-in direction, which pumps the lubricant 28 from the capillary seal portion TS to the inside of the fluid dynamic bearing, and supports the rotating body R by the pressure. The lubricant 28 filling the spaces in the first radial dynamic pressure generating site RB1, the second radial dynamic pressure generating site RB2, the first thrust dynamic pressure generating site SB1, and the second thrust dynamic pressure generating site SB2 is shared.

The capillary seal portion TS is formed by the outer circumferential surface 14e of the housing 14 and by the inner circumferential surface 26d of the thrust member 26. In the capillary seal portion TS, the spacing between the outer circumferential surface 14e of the housing 14 and the inner circumferential surface 26d of the thrust member 26, which form the capillary seal portion TS, becomes gradually larger toward the bottom in the axial direction.

More specifically, the outer circumferential surface 14e of the housing 14 included in the capillary seal portion TS has an inclined surface whose radius becomes gradually smaller toward the bottom in the axial direction. The inner circumferential surface 26d of the thrust member 26 facing the outer circumferential surface 14e of the housing has an inclined surface whose radius becomes gradually smaller toward the bottom in the axial direction.

The amount of the lubricant 28 to fill the space is set such that the boundary surface (hereinafter, referred to as "the vapor-liquid interface of the lubricant") between the lubricant 28 and the air is located in the middle of the capillary seal portion TS. The fluid dynamic bearing has the vapor-liquid interface of the lubricant 28 in an area formed between the base member 10 and the hub 20. More specifically, the vapor-liquid interface of the lubricant 28 is located on the upper side of the securing portion 10d in the axial direction. This allows the capillary seal portion TS to seal the lubricant 28 by capillarity, thus preventing the lubricant 28 from leaking outwards.

The lubricant 28 fills a lubricant storing portion including, for example, the spaces forming the first radial dynamic pressure generating site RB1, the second radial dynamic pressure generating site RB2, the first thrust dynamic pressure generating site SB1, and the second thrust dynamic pressure generating site SB2, the space between the housing 14 and the thrust member 26, and the space between the circular projecting portion 16b and the hub 20.

The capillary seal portion TS is formed so that the overall radius becomes gradually smaller toward the bottom in the axial direction. This allows a centrifugal force caused by the rotation of the rotating body R to act such that the lubricant 28 is moved upward in the axial direction, thus preventing the lubricant 28 from leaking outwards.

An explanation is now given of a configuration where the evaporation threshold time of the lubricant 28 is increased by slowing down the speed of the evaporation of the lubricant 28 stored in the fluid dynamic bearing. According to the research conducted by the inventors of the present invention, it is found that the decrease in the vapor pressure of the lubricant 28 near the vapor-liquid interface of the lubricant 28 promotes the evaporation. In other words, when the vapor pressure becomes saturated, the evaporation of the lubricant 28 almost stops; however, when there is a lot of circulation of the air between the area, between the hub 20 and the base member 10, and the external area, the vapor pressure of the lubricant 28 near the vapor-liquid interface decreases, and the evaporation of the lubricant 28 is thus promoted. The air circulation to and from the external area occurs mainly through the second narrow gap portion 52.

The opening 10c of the cylindrical portion 10a is provided on the outside of the vapor-liquid interface of the lubricant 28 in the radial direction, facing the cylindrical hanging portion 20b in the radial direction, so as to form a third narrow gap portion 53 with the cylindrical hanging portion 20b. The third narrow gap portion 53 is a gap between the opening 10c and the cylindrical hanging portion 20b facing the opening 10c. The dimension of the third narrow gap portion 53 in the axial direction means the range where the opening 10c and the cylindrical hanging portion 20b overlaps with each other in the radial direction. The opening 10c of the cylindrical portion is provided so that the range of the opening 10c in the axial direction overlaps with the vapor-liquid interface of the lubricant 28 and that the opening 10c surrounds the vapor-liquid interface.

Such a configuration allows gas of the lubricant 28 near the vapor-liquid interface to flow downwards from the vapor-liquid interface in the capillary seal portion TS, to flow upwards in the third narrow gap portion 53, and to flow in the radial direction between the coil 18 and the hub 20. The gas of the lubricant 28 near the vapor-liquid interface flows in the radial direction in the first narrow gap portion 51 and in the second narrow gap portion 52 and then flows obliquely upwards so as to reach the external air.

The disk drive device 100 is configured such that the outer circumferential wall portion 20c surrounds the attraction plate 44 and that the range of the outer circumferential wall portion 20c in the axial direction overlaps with the range of the attraction plate 44 in the axial direction, in between the first narrow gap portion 51 and the second narrow gap portion 52. Thus, the air circulation is limited in these parts. The thickness dimension of the attraction plate 44 in the axial direction is larger than the dimension of the second narrow gap portion 52 in the axial direction. Thus, the range of the outer circumferential wall portion 20c in the axial direction overlaps with the range of the attraction plate 44 in the axial direction. Therefore, the amount of the air circulation between the space, between the base member 10 and the hub 20, and the external air is decreased, suppressing the evaporation of the lubricant 28. Thus, the evaporation threshold time of the lubricant 28 becomes longer.

The disk drive device 100 is formed so that the range, in which the outer circumferential wall portion 20c and the attraction plate 44 overlap with each other in the axial direction, is at least 0.15 mm. The disk drive device 100 is formed so that the gap between the outward extension portion 20d of the outer circumferential wall portion 20c and the attraction plate 44 in the axial direction is at most 0.3 mm. There is a phenomenon where the convective flow of the air, between the hub 20 and the base member 10, along the rotational direction due to the rotation of the motor causes the air to flow outwardly in the radial direction. In the configuration where the second narrow gap portion 52 is provided at the position closer to the base member 10 in the axial direction compared to that of the first narrow gap portion 51 such that the second narrow gap portion 52 surrounds the first narrow gap portion 51, the air near the first narrow gap portion 51 that is flowing outwardly in the axial direction is blocked by the lower end portion of the outward extension portion 20d of the outer circumferential wall portion 20c, producing a fluid friction. Thus, the outward flow of the air in the radial direction is controlled.

The evaporation of the lubricant 28 proceeds rapidly until the vapor pressure, which is not saturated, in between the hub 20 and the base member 10 is raised to reach the saturated vapor pressure of the lubricant. The dimension of the disk drive device 100 in the axial direction increases in accordance with the number of recording disks 120 to be mounted. Particularly, when four or more recording disks 120 are mounted on the disk drive device 100, the volume of the air exists in the area between the hub 20 and the base member 10 becomes large. Thus, it takes long for the vapor pressure of the air to reach the saturated vapor pressure of the lubricant, being a factor for the evaporation threshold time to be short.

In contrast, the base member 10 is further provided with the base extension portion 10b. The base extension portion 10b extends outwardly in the radial direction from the base of the securing portion 10d of the cylindrical portion 10a, faces the lower surface of the coil 18 in the axial direction, and has a tubular side surface. Arranging the base extension portion 10b at a position closer to the coil 18 in the axial direction compared to the position of the upper surface of the attraction plate 44 allows for reduction in the amount of the air in the area formed between the base member 10 and the hub 20. In other words, the amount of the air in the area formed between the base member 10 and the hub 20 can be reduced by the amount corresponding to the special difference created by providing the base extension portion 10b. The attraction plate 44 is provided such that the range of the attraction plate 44 in the axial direction overlaps with the range of the side surface of the base extension portion 10b in the axial direction and surrounds the base extension portion 10b. For example, the attraction plate 44 is fit onto the side surface of the base extension portion 10b. This is preferable in that it does not take long to position the attraction plate 44 when fixing the attraction plate 44 to the base member 10.

The drive load of the disk drive device 100 in the axial direction increases in accordance with the number of recording disks 120 to be mounted. Particularly, when four or more recording disks 120 are mounted on the disk drive device 100, the start time becomes longer. In response to this problem, the dimension of the magnet 24 in the axial direction is set to be long enough for the start time of the disk drive device 100 to be at most a pre-set maximum value. This allows for magnetic flux acting on salient poles to be increased so that drive torque is increased. Thus, the start time of the disk drive device 100 can be reduced. The maximum value varies depending on the type of the disk drive device 100 and is set to be maximum acceptable start time of the disk drive device 100.

In order to increase the dimension of the magnet 24 in the axial direction, the attraction plate 44 is provided at a position that is lower than the upper end of the base extension portion 10b in the axial direction. In other words, the disk drive device 100 is configured such that the height of the attraction plate 44 in the axial direction is lower than that of the side surface of the base extension portion 10b.

As the thickness dimension of the attraction plate 44 in the axial direction and the dimension of the first narrow gap portion 51 in the axial direction become larger, the size of the disk drive device 100 also becomes larger. On the other hand, when the thickness dimension of the attraction plate 44 in the axial direction is decreased, the magnetic flux may become saturated, and the desired attraction force may thus not be obtained. When the dimension of the first narrow gap portion 51 in the axial direction becomes smaller, a possibility is increased where the magnet 24 and the attraction plate 44 come into contact with each other due to processing variations.

Therefore, the thickness dimension of the attraction plate 44 in the axial direction is set to be substantially same as the dimension of the first narrow gap portion 51 in the axial direction so as to ensure the effect of limiting the air circulation while ensuring the attraction force of at least a pre-set minimum value. For example, the thickness dimension of the attraction plate 44 in the axial direction and the dimension of the first narrow gap portion 51 in the axial direction may be at least 0.2 mm. When the dimension of the attraction plate 44 in the axial direction is at least 0.2 mm, the attraction force of the attraction plate 44 can be at least 1 (N), which is the minimum value. Experiences of the inventors of the present invention, who are skilled in the art, show that the dimension of the first narrow gap portion 51 in the axial direction may change by about 0.2 mm due to processing variations or run-out during the rotation and that the dimension of the first narrow gap portion 51 in the axial direction of at least 0.2 mm can thus reduce the possibility of the rotating body R and the fixed body S coming into contact with each other. The dimension of the first narrow gap portion 51 in the axial direction is determined by the pedestal portion 20e of the hub 20, the magnet 24, the attraction plate 44, and the base member, and the processing variations are thus likely to become large. Therefore, the dimension of the first narrow gap portion 51 in the axial direction is preferably of at least a certain size. Preferably, the dimension of the first narrow gap portion 51 in the axial direction is at most 0.4 mm so as to ensure the effect of limiting the air circulation.

When the dimension of the second narrow gap portion 52 in the axial direction is smaller than that in the radial direction, the distance in which the circulation of the air to the outside meets a resistance is short, and the effect of limiting the air circulation in the radial direction thus cannot be fully achieved. Therefore, the disk drive device 100 is configured such that the dimension of the second narrow gap portion 52 in the radial direction is at least three times the dimension of the second narrow gap portion 52 in the axial direction, so as to ensure the pre-set effect that limits the air circulation in the second narrow gap portion 52. For example, the effect of limiting the air circulation can be ensured by setting the dimension of the second narrow gap portion 52 in the axial direction to be 0.15 mm and the dimension of the second narrow gap portion 52 in the radial direction to be 0.75 mm.

The first narrow gap portion 51 and the second narrow gap portion 52 limit the air circulation in cooperation with each other. When the dimension of the first narrow gap portion 51 in the axial direction is set to be too small, a possibility is increased where the magnet 24 and the attraction plate 44 come into contact with each other due to variations in processing or mounting the magnet 24 and the attraction plate 44. In consideration of the phenomenon where the air flows outwardly in the radial direction when the air between the hub 20 and the base member 10 convectively flows along the rotational direction due to the rotation of the motor, it is preferred that the second narrow gap portion 52 be located on the outside of the first narrow gap portion 51 in the radial direction and that the dimension of the second narrow gap portion 52 in the axial direction be smaller.

The disk drive device 100 is configured such that the dimension of the second narrow gap portion 52 in the axial direction is smaller than that of the first narrow gap portion 51 in the axial direction. This allows for a reduction in the amount of gas that flows to the outside via the second narrow gap portion 52 compared to when the dimension of the second narrow gap portion 52 in the axial direction is larger than that of the first narrow gap portion 51 in the axial direction. For example, the dimension of the first narrow gap portion 51 in the axial direction is 0.4 mm and the dimension of the second narrow gap portion 52 in the axial direction is 0.25 mm.

When the outer circumferential diameter of the attraction plate 44 is large, the magnetic flux can leak into the external area. The leakage of the magnetic flux flowing into the recording disk 120 and the magnetic head 124 can be added to their output signals as noise. Therefore, a problem can arise where operations of reading and writing magnetic data may be hampered. Therefore, the outer circumferential diameter of the attraction plate 44 may set to be smaller than the inner circumferential diameter of the recording disk 120. This allows for the attraction plate 44 and the recording disk 120 to be apart from each other to a certain extent, thus preventing the magnetic flux generated from the attraction plate 44 from acting on the recording disk 120 or the magnetic head 124.

When the central axis of the attraction plate 44 is misaligned with the central axis of the magnet 24, the magnetic flux generated from the magnet 24 and the attraction plate 44 may leak out. Thus, the central axis of the attraction plate 44 and the central axis of the magnet 24 are substantially aligned. This prevents the magnetic flux generated from the magnet 24 and the attraction plate 44 from leaking out. The central axis of the attraction plate 44 and the central axis of the magnet 24 are substantially aligned with a margin of error of +/−0.1 mm.

The inner circumferential diameter of the attraction plate 44 is formed to be smaller that that of the magnet 24, and the outer circumferential diameter of the attraction plate 44 is formed to be larger than the outer circumferential diameter of the magnet 24. The magnetic flux produced from the magnet 24 extends toward the attraction plate 44. This configuration allows the attraction plate 44 to efficiently receive the magnetic flux produced from the magnet 24, effectively allowing the attraction force to be ensured. For example, the inner circumferential diameter of the attraction plate 44 is 16.5 mm and is formed to be smaller by 0.5 mm than the inner circumferential diameter of the magnet 24, which is 17 mm. The outer circumferential diameter of a plurality of salient poles is 16.55 mm and is substantially identical with the inner circumferential diameter of the attraction plate 44. The outer circumferential diameter of the attraction plate 44 is 19.5 mm and is formed to be larger by 0.5 mm than the outer circumferential diameter of the magnet 24, which is 19 mm.

The outer circumferential wall portion 20c also functions as a yoke of the magnet 24, and a magnetic circuit passing thorough the outer circumferential wall portion 20c is formed on the outer circumferential side of the magnet 24. Increasing the thickness of the outer circumferential wall portion 20c in the radial direction and decreasing the thickness of the magnet 24 in the radial direction reduce the operation magnetic flux of the magnet 24, and the magnetic flux acting on the salient poles is also reduced. There is a problem such that the torque generated by the driving force generator is reduced when the magnetic flux acting on the salient poles is reduced. Increasing the thickness of the outer circumferential wall portion 20c in the radial direction and the thickness of the magnet 24 in the radial direction increases the diameter of the outer circumferential wall portion 20c. Thus, the thickness of the magnet 24 in the radial direction may be set to be larger than the thickness of the outer circumferential wall portion 20c, onto which the recording disk 120 is fit, in the radial direction. For example, the thickness of the outer circumferential wall portion 20c, onto which the recording disk 120 is fit, in the radial direction is 0.5 mm, and the dimension of the magnet 24 in the axial direction is 1 mm, which is twice the size of the thickness of the outer circumferential wall portion 20c in the radial direction. This can prevent the reduction of the torque generated by the driving force generator and thus prevent the increase of the drive current for generating desired torque.

On the other hand, when the thickness of the outer circumferential wall portion 20c in the radial direction is decreased too much, the magnetic resistance of the magnetic circuit on the side of the outer circumference of the magnet 24 increases. As a result, both the magnetic flux of the magnet 24 and the magnetic flux acting on the salient poles decrease. When the thickness dimension of the attraction plate 44 in the axial direction is increased too much, the magnetic flux acting on the salient poles is reduced while the magnetic flux acting on the attraction plate 44 increases. There is a problem such that the torque generated by the driving force generator is reduced when the magnetic flux acting on the salient poles is reduced. Therefore, the thickness of the outer circumferential wall portion 20c, onto which the recording disk 120 is fit, in the radial direction may be set to be larger than the thickness dimension of the attraction plate 44 in the axial direction. For example, the thickness of the outer circumferential wall portion 20c, onto which the recording disk 120 is fit, in the radial direction is 0.5 mm, and the thickness dimension of the attraction plate 44 in the axial direction is 0.4 mm. This can prevent the reduction of the torque generated by the driving force generator and thus prevent the increase of the drive current for generating desired torque.

Figure 3:
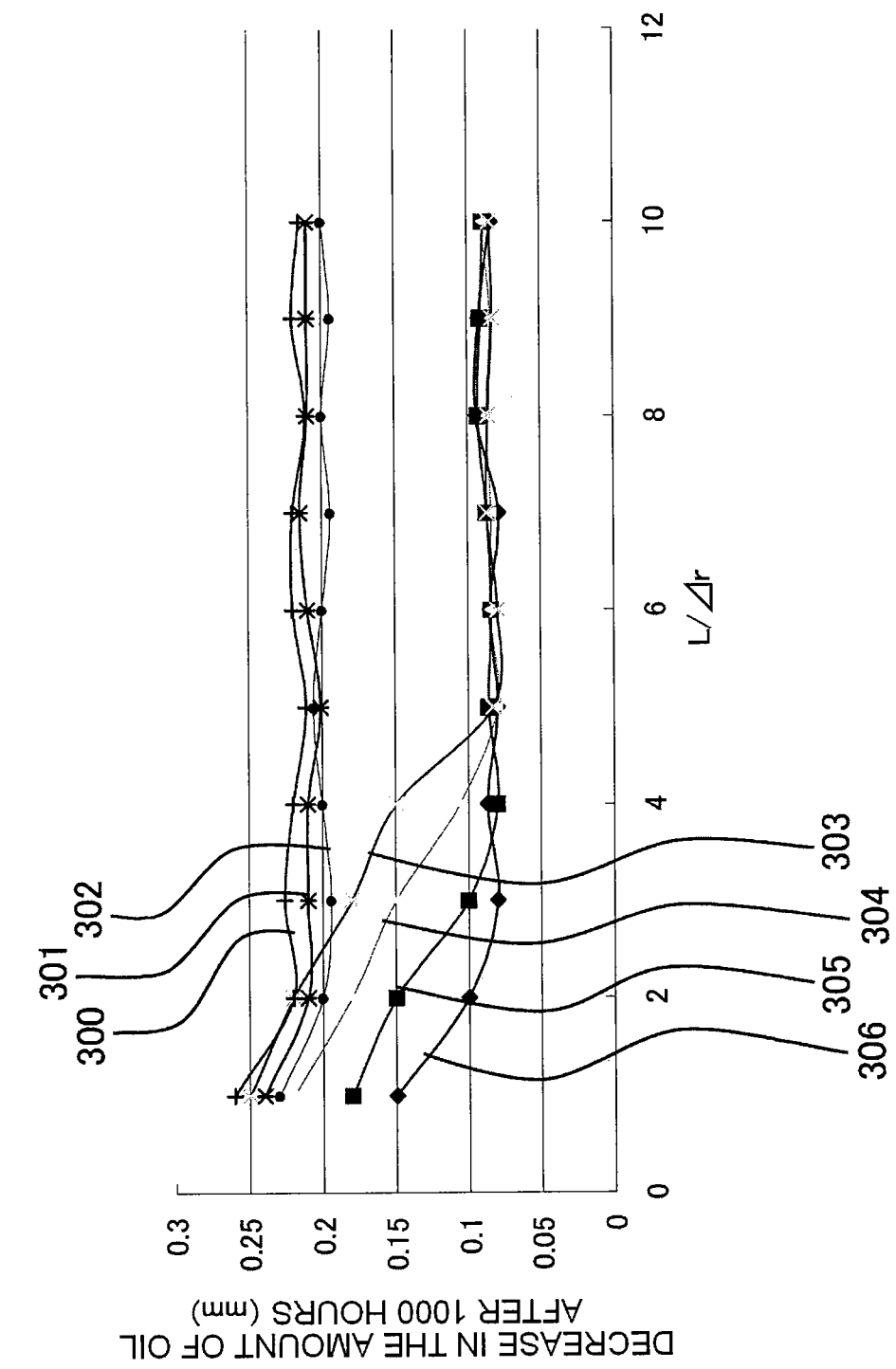
FIG. 3 is a view showing the relationship between the shape of a third narrow gap portion and the evaporation amount of a lubricant of the disk drive device according to the embodiment.

FIG. 3 is a view showing the relationship between the shape of the third narrow gap portion 53 and the evaporation amount of the lubricant 28 of the disk drive device 100 according to the embodiment. The horizontal axis represents a relationship between the dimension of the third narrow gap portion 53 in the radial direction and the dimension of the third narrow gap portion 53 in the axial direction and shows a ratio obtained by dividing the dimension L of the third narrow gap portion 53 in the axial direction by the dimension Δr of the third narrow gap portion 53 in the radial direction. It is shown that the third narrow gap portion 53 becomes smaller in the radial direction and larger in the axial direction toward the right along the horizontal axis. The vertical axis represents the amount of the displacement of the vapor-liquid interface of the lubricant 28 in the axial direction after 1000 hours after being filled with the lubricant 28. In other words, the vertical axis represents the evaporation amount of the lubricant 28 and shows that the evaporation amount of the lubricant 28 is larger toward the top along the vertical axis.

When there is a lot of circulation of the air between the area near the vapor-liquid interface and the area between the hub 20 and the base member 10, the vapor pressure of the lubricant 28 near the vapor-liquid interface decreases, and the evaporation of the lubricant 28 is thus promoted. The experiment shown in FIG. 3 shows how the evaporation amount of the lubricant 28 changes when the dimension of the third narrow gap portion 53 is changed.

A first experimental result 300, a second experimental result 301, a third experimental result 302, a fourth experimental result 303, a fifth experimental result 304, a sixth experimental result 305, and a seventh experimental result 306 show experimental results when the dimensions of the third narrow gap portion 53 in the radial direction of 0.5 mm, 0.3 mm, 0.25 mm, 0.2 mm, 0.15 mm, 0.10 mm, and 0.15 mm, respectively.

As shown in the first experimental result 300, the second experimental result 301, and the third experimental result 302, when the dimension of the third narrow gap portion 53 in the radial direction is at least 0.25 mm, the evaporation amount of the lubricant 28 after 1000 hours is 0.2 mm regardless of any change of the third narrow gap portion 53 in the axial direction. Thus, an effect of reducing the evaporation amount was not obtained. On the other hand, as shown in the fourth experimental result 303, the fifth experimental result 304, the sixth experimental result 305, and the seventh experimental result 306, when the dimension of the third narrow gap portion 53 is configured to be at most 0.2 mm in the radial direction and the dimension of the third narrow gap portion 53 in the axial direction is configured to be at least five times more than the dimension of the third narrow gap portion 53 in the radial direction, the evaporation amount of the lubricant 28 after 1000 hours is 0.1 mm, which is at most half of the evaporation amount obtained in the first experimental result 300 through the third experimental result 302. Therefore, configuring the dimension of the third narrow gap portion 53 in the radial direction to be at most 0.2 mm and the dimension of the third narrow gap portion 53 in the axial direction is configured to be at least five times more than the dimension of the third narrow gap portion 53 in the radial direction allows for the evaporation of the lubricant 28 to be suppressed.

In the embodiment, a situation where the sleeve 16 is fixed and where the shaft 22 rotates with respect to the base member 10 has been explained. As an exemplary variation, a shaft-fixed type disk drive device may be implemented in which the shaft is fixed to the base member and in which the sleeve and the hub rotate with respect to the shaft. In this case, the shaft and the base member may be formed separately, and the shaft may be inserted and fixed into the hole provided in the base member.

The embodiment describes the case where the housing 14 is directly provided on the base member 10. However, the present invention is not limited to this. For example, a configuration may be implemented where a brushless motor comprising a rotor, a stator core, a coil, and a base member is separately formed such that the brushless motor is mounted on a chassis.

The embodiment describes the case where the housing 14 and the sleeve 16 are separate from each other. However, the present invention is not limited to this. The housing and the sleeve may be formed integrally. This allows for the number of parts to be reduced, and the efforts for the assembly can thus be trimmed.

The embodiment describes the disk drive device 100 that functions as a hard disk drive device. However, the present invention is not limited to this. For example, the disk drive device 100 may function as an optical disk recording and reproducing device such as a CD (Compact Disc) device or a DVD (Digital Versatile Disc) device.

The present invention should not be limited to each of the aforementioned embodiments, and various modifications such as design modifications can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A disk drive device comprising:
   a hub having an outer circumferential wall portion configured to hold a recording disk;
   a base member having a cylindrical portion, whose central axis is the rotation axis of the hub, on a surface on the side of the hub;
   a fluid dynamic bearing configured to hold a lubricant and rotatably support the hub relative to the base member;
   a stator core having a ring portion fixed on the outer circumferential surface of the cylindrical portion and a plurality of salient poles extending in the radial direction from the ring portion;
   a coil wound around the plurality of salient poles;
   a magnet fixed to the inner circumferential surface of the outer circumferential wall portion, the magnet being arranged to radially face the plurality of salient poles and provided along the circumferential direction with a plurality of magnetized poles for driving; and
   a ring-shaped attraction plate fixed to the base member, the attraction plate being arranged to face the magnet in the axial direction, and including a magnetic material, wherein
   a first narrow gap portion is formed between the attraction plate and the magnet,
   a second narrow gap portion is formed between the base member and the end surface of the outer circumferential wall portion on the side of the base member, and
   the outer circumferential wall portion is configured to surround the attraction plate such that the range of the outer circumferential wall portion in the axial direction overlaps with the range of the attraction plate in the axial direction.

2. The disk drive device according to claim 1, wherein the thickness dimension of the attraction plate in the axial direction is larger than the dimension of the second narrow gap portion in the axial direction.

3. The disk drive device according to claim 1, wherein a range, in which the outer circumferential wall portion and the attraction plate overlap with each other in the axial direction, is at least 0.15 mm.

4. The disk drive device according to claim 1, wherein a gap between the outer circumferential wall portion and the attraction plate is at most 0.3 mm.

5. The disk drive device according to claim 1, wherein
   the base member extends outwardly in the radial direction from the cylindrical portion, the base member facing the coil, and is provided with a base extension portion having a tubular side surface, and
   the attraction plate is provided such that the range of the attraction plate in the axial direction overlaps with the range of the side surface of the base extension portion in the axial direction and surrounds the base extension portion.

6. The disk drive device according to claim 5, wherein the attraction plate is fit onto the side surface of the base extension portion.

7. The disk drive device according to claim 5, wherein the height of the attraction plate in the axial direction is lower than that of the side surface of the base extension portion.

8. The disk drive device according to claim 1, wherein the thickness dimension of the attraction plate in the axial direction is substantially identical with the dimension of the first narrow gap portion in the axial direction.

9. The disk drive device according to claim 1, wherein the thickness dimension of the attraction plate in the axial direction is at least 0.2 mm.

10. The disk drive device according to claim 1, wherein the dimension of the first narrow gap portion in the axial direction is between 0.2 mm and 0.4 mm.

11. The disk drive device according to claim 1, wherein the dimension of the second narrow gap portion in the radial direction is at least three times the dimension of the second narrow gap portion in the axial direction.

12. The disk drive device according to claim 1, wherein the dimension of the second narrow gap portion in the axial direction is smaller than the dimension of the first narrow gap portion in the axial direction.

13. The disk drive device according to claim 1, wherein the outer circumferential diameter of the attraction plate is smaller than the inner circumferential diameter of the recording disk.

14. The disk drive device according to claim 1, wherein the inner circumferential diameter of the attraction plate is smaller than the inner circumferential diameter of the magnet and wherein the outer circumferential diameter of the attraction plate is larger than the outer circumferential diameter of the magnet.

15. The disk drive device according to claim 1, wherein the thickness dimension of the outer circumferential wall portion onto which the recording disk is fit is larger than the thickness dimension of the attraction plate in the axial direction.

16. The disk drive device according to claim 1, wherein
the fluid dynamic bearing has a boundary surface between a lubricant and air in an area formed between the base member and the hub,
an opening of the cylindrical portion is provided on the outside of the boundary surface in the radial direction,
the hub having a cylindrical hanging portion that faces the opening in the radial direction and forms a third narrow gap portion with the opening, and
the dimension of the third narrow gap portion in the radial direction is at most 0.2 mm and the dimension of the third narrow gap portion in the axial direction is at least five times the dimension of the third narrow gap portion in the radial direction.

17. The disk drive device according to claim 1, wherein the opening of the cylindrical portion is provided so that the range of the opening of the cylindrical portion in the axial direction overlaps with a boundary surface between a lubricant and air and that the opening surrounds the boundary surface.

18. A disk drive device comprising:
a hub having an outer circumferential wall portion configured to hold a recording disk;
a base member having a cylindrical portion, whose central axis is the rotation axis of the hub, on a surface on the side of the hub;
a fluid dynamic bearing configured to hold a lubricant and rotatably support the hub relative to the base member;
a stator core having a ring portion fixed on the outer circumferential surface of the cylindrical portion and a plurality of salient poles extending in the radial direction from the ring portion;
a coil wound around the plurality of salient poles; and
a magnet fixed to the inner circumferential surface of the outer circumferential wall portion, the magnet being arranged to radially face the plurality of salient poles and provided along the circumferential direction with a plurality of magnetized poles for driving, wherein
the fluid dynamic bearing has a boundary surface between a lubricant and air in an area formed between the base member and the hub,
an opening of the cylindrical portion is provided on the outside of the boundary surface in the radial direction,
the hub has a cylindrical hanging portion that faces the opening in the radial direction and forms a narrow gap portion with the opening,
the dimension of the narrow gap portion in the radial direction is at most 0.2 mm and the dimension of the narrow gap portion in the axial direction is at least five times the dimension of the narrow gap portion in the radial direction.

19. The disk drive device according to claim 18, wherein the opening of the cylindrical portion is provided so that the range of the opening of the cylindrical portion in the axial direction overlaps with a boundary surface between a lubricant and air and that the opening surrounds the boundary surface.

20. A disk drive device comprising:
a hub having an outer circumferential wall portion configured to hold a recording disk;
a base member having a cylindrical portion, whose central axis is the rotation axis of the hub, on a surface on the side of the hub;
a fluid dynamic bearing configured to hold a lubricant and rotatably support the hub relative to the base member;
a stator core having a ring portion fixed on the outer circumferential surface of the cylindrical portion and a plurality of salient poles extending in the radial direction from the ring portion;
a coil wound around the plurality of salient poles; and
a magnet fixed to the inner circumferential surface of the outer circumferential wall portion, the magnet being arranged to radially face the plurality of salient poles and provided along the circumferential direction with a plurality of magnetized poles for driving; and
wherein the surface of the base member on the side of the hub is provided with a circumferential wall portion surrounded by the outer circumferential wall portion,
wherein the range of the outer circumferential wall portion in the axial direction overlaps the range of the circumferential wall portion in the axial direction,
wherein a narrow gap portion in the axial direction with a radial dimension larger than an axial dimension is formed between the base member and the outer circumferential wall portion, and
wherein a gap space in the radial direction is formed between the circumferential wall portion and the outer wall circumferential portion.

* * * * *